United States Patent Office 3,535,783
Patented Oct. 27, 1970

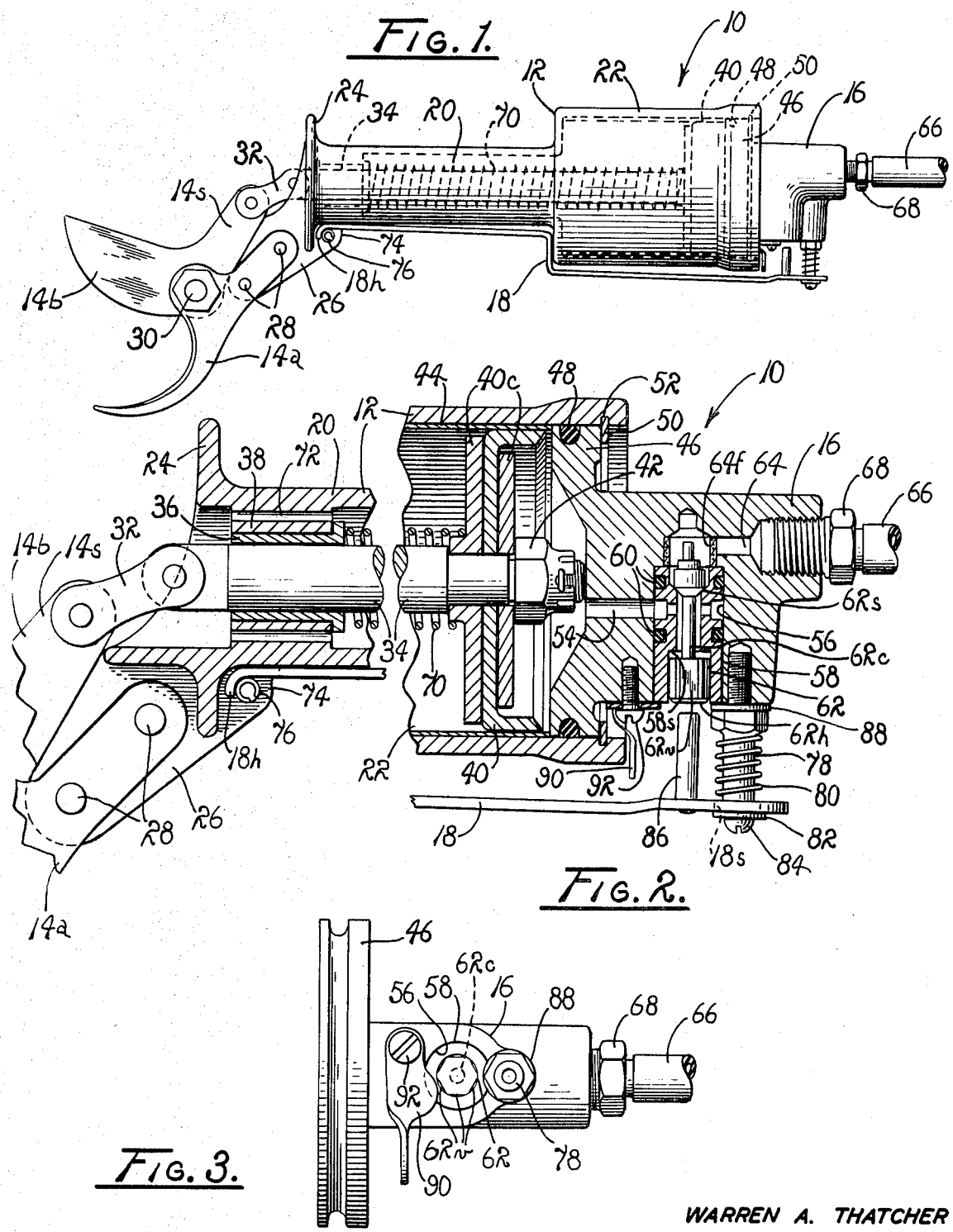

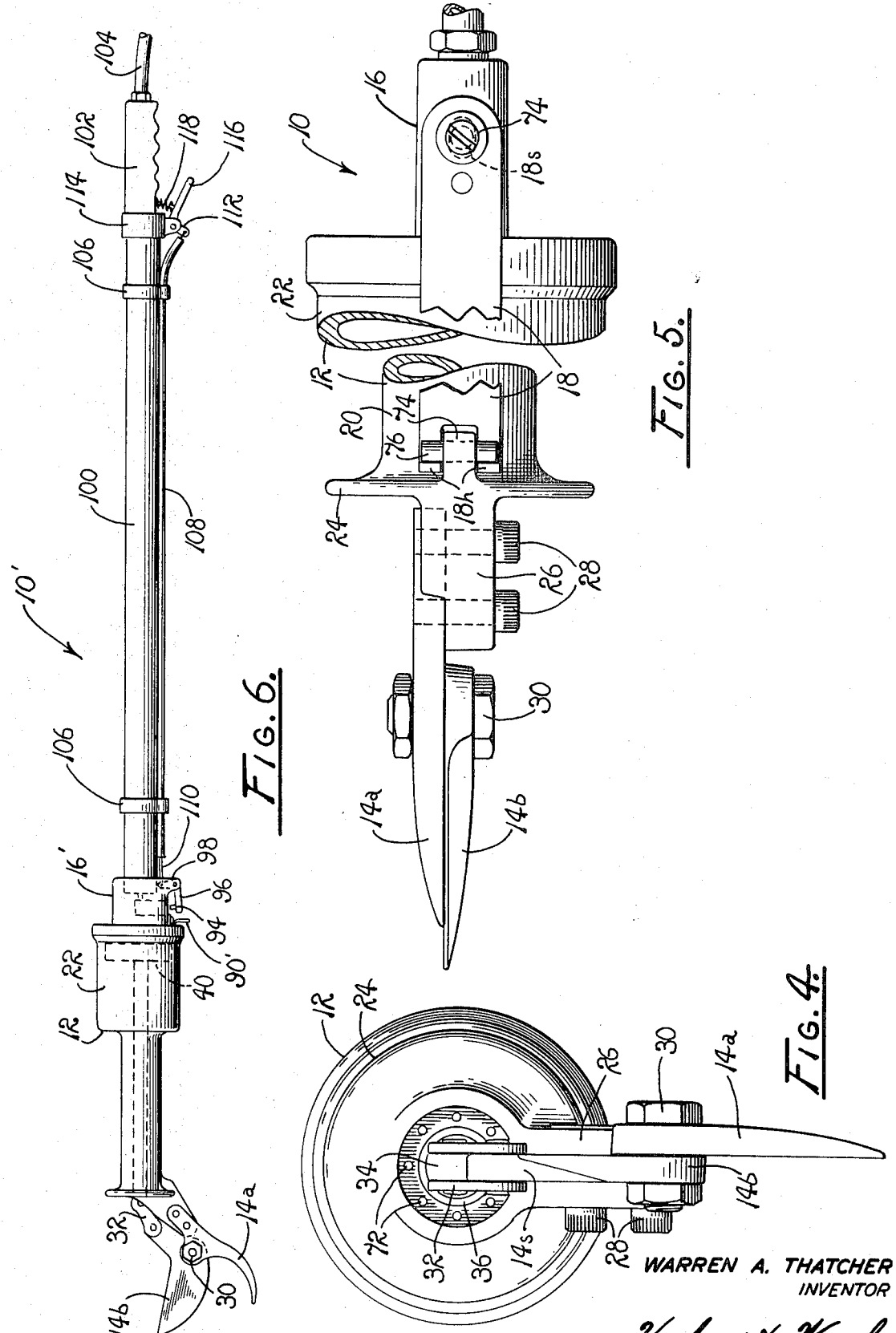

1

3,535,783
PNEUMATIC CUTTER
Warren A. Thatcher, Fresno, Calif., assignor to Associated Compressor & Equipment, Inc., a corporation of California
Filed Apr. 29, 1968, Ser. No. 724,946
Int. Cl. B26b 15/00
U.S. Cl. 30—228                                    4 Claims

ABSTRACT OF THE DISCLOSURE

A cutter adapted to operate in a variety of positions having a multidiameter hollow housing integrally formed of high tensile strength material with a handle portion of small diameter and coextensive control lever both conveniently encompassed by the hand of an operator in the various positions of the cutter. In a remotely controlled form, an extension is fixed to the housing and carries a pull wire for controlling the cutter from the distal end of the extension.

BACKGROUND OF INVENTION

The present invention relates to cutting tools and more particularly to cutters which are pneumatically operated. Heretofore such cutters have been constructed of a multiplicity of parts which in the course of the cutting operation have been subjected to strains and stresses ultimately leading to inoperability because of loosening and complete or partial destruction of some parts. Moreover, such cutters have been limited in their application because of the inability of the operator to position the cutter properly relative to the material to be cut in particular cutting situations, such as in the pruning of vines, trees and shrubs, due to the relative placement of the blades and operating trigger of the cutter.

SUMMARY OF INVENTION

It is therefore an object of the present invention to provide a pneumatically operated cutter of improved construction and effectiveness in performing a cutting operation.

Another object is to provide a more economical cutter.

Another object is to provide an improved cutter of a size and weight easily handled by an operator.

Another object is to provide a cutter having cutting blades and operating mechanisms so located relatively to a handle portion as to be substantially universally positionable with respect to the work to be cut without reduction in the ease of handling the cutter or its reliability of operation.

Another object is to provide a cutter having a simplified construction and employing a minimum number of moving parts for longer trouble-free service.

Another object is to provide a cutter constructed of a fewer number of parts and which is easily maintained using ordinary tools, such as pliers, wrenches, screwdrivers and the like.

Another object is to provide a cutter having a movable blade and a handle portion grasped by the operator, and safety means including a hand guard between the blade and the handle portion.

Another object is to provide a cutter having a safety mechanism preventing inadvertent operation of the cutting blade.

The aforementioned and other objects and advantages of the present invention are achieved by providing a multidiameter hollow housing of unitary integral construction formed from a high tensile stress material and including a larger diameter portion serving as a piston chamber. Connected to one end of the piston chamber

2 is a handle portion of smaller diameter and of a size easily encompassed by the hand of an operator, the distal end of the handle portion terminating in a reinforcing rib and a mounting boss to which a cutting blade is fixed. The reinforcing rib serves as a guard for protecting the hand of the operator. A second blade is movably mounted on the fixed blade and is linked to one end of a connecting rod passing through the handle portion and fixed to a piston mounted for movement in the piston chamber. The piston is actuated by pressurized air admitted through a valve unit which also serves as an end closure for the piston chamber, the unit being operated by an elongated trigger bar or control lever having a portion substantially coextensive with the handle portion and encompassed by the hand of the operator. The unit also mounts a safety lever adapted to be disposed to prevent inadvertent operation of the control lever. In another form of the cutter, an extension is fixed to the unit and a pull wire actuated from the far end of the extension controls the unit.

BRIEF DESCRIPTION OF DRAWINGS

FIG. 1 is an elevation of a cutter embodying the principles of the present invention.

FIG. 2 is an enlarged fragmentary, longitudinal section of a portion of the cutter of FIG. 1.

FIG. 3 is a bottom plan view of a valve unit of the cutter, showing a safety lever thereof.

FIG. 4 is a somewhat enlarged front view of the cutter.

FIG. 5 is a somewhat enlarged fragmentary bottom plan view of the cutter.

FIG. 6 illustrates a modification of the cutter of the present invention adapted for remote control to perform work at a distance from the operator.

DESCRIPTION OF EMBODIMENTS

Hand-gripped form

Referring to the dawings, there is illustrated in FIG. 1 one form of a cutter embodying the principles of the present invention and designated generally by reference numeral 10. The cutter 10 consists essentially of a hollow housing 12, a pair of cutting blades 14a and 14b, a valve unit 16 and an actuating trigger bar or control lever 18.

The housing 12 is of unitary integral construction being formed in one piece from a material having a high tensile strength and relatively light in weight, such as a lightweight heat treated alloy material. Housing 12 has a handle portion 20 of relatively smaller diameter and of a size easily grasped by the hand of an operator. One end of the portion 20 is integrally joined to a chamber portion 22 of an enlarged diameter. At its other end, the handle portion 20 is integrally formed with a reinforcing rib 24 from which projects a mounting boss 26 of substantial thickness to which the blade 14a is attached by screw bolts 28.

The blade 14b is pivotally mounted on the blade 14a by a pivot bolt 30 and has a shank 14s integrally formed therewith engaged by the boss 26 for limiting movement thereof, as shown in FIG. 1. Inviting attention also to FIG. 2, the shank 14s is pivotally connected to one end of a coupler link 32, the other end of the link being pivotally connected to one end of a connecting rod 34. The rod is journaled for sliding in a sleeve bearing or bushing 36 supported in a collar 38 which is located within the hollow handle portion 20 and integral therewith.

The connecting rod 34 extends through the handle 20 and into the chamber portion 22 of the housing 12 where it is connected to a piston cup 40 by means of a pair of clamping plates 40c and a clamping nut 42. The piston cup 40 is made of any suitable material in leak-tight engagement with a cylindrical liner 44 of stainless steel or the like, the piston cup and the liner being replaceable when impaired by wear.

Movement is imparted to the piston cup and the connecting rod by means of pressurized air admitted through the valve unit 16 which is formed with an annular flange-like portion 46 fitted within the chamber portion 22 and serving as an end closure therefor. The closure 46 is sealed to the chamber portion 22 by an O-ring 48 and is held in sealing engagement by a split retaining ring 50 seating in an annular groove 52 formed in the interior wall of the chamber portion adjacent one end thereof.

The unit 16 is formed with a bore or passageway 54, one end of which is in communication with the chamber portion 22, the other end being in communication with a bore 56 in which is received a valve housing 58. The valve housing is sealed to the walls of the bore 56 by O-rings 60. Mounted for slight sliding movement within the valve housing 58 is a control valve 62 having an enlargement or head 62h. Viewing FIGS. 2 and 3, the head 62h is of angular cross section with venting flats 62v which are closed off when the head is seated against an annular ledge or shoulder 58s in the valve housing. The head is connected by a slender portion 62c with a seating portion or valve seat 62s having a frusto-concial surface adapted to seat on a cooperating frusto-conical surface formed on the interior of the valve housing for closing off flow therethrough. The movement of the valve 62 relative to the housing 58 is limited to about 0.030 of an inch but is sufficient to seat the head 62h for closing off flow past the flats 62v and to place the valve in open condition to communicate the interior of the valve housing with a bore or passageway 64. The passageway 64 is in communication with a flexible hose 66 connected to a supply of pressurized air and swively connected to the unit 16 by a suitable screw fitting 68. If desired, the air may be made to pass through a filter sleeve 64f prior to flow through the valve housing 58.

Thus, pressurized air admitted through the hose 66 and the passageway 64 exerts pressure against the valve seat 62s, causing it to seat tighter and deny entry of air to the interior of the valve housing 58. However, when the control valve 62 is moved to unseat the valve and the frusto-conical surfaces are separated, pressurized air passes therebetween and through the passageway 54 into the chamber portion 22 for imparting movement to the piston cup 40 and the connecting rod 34. Such movement compresses a coil spring 70 disposed about the connecting rod and reacting between the bearing 36 and one of the clamping plates 40c. Air ahead of the piston cup 40 escapes through a plurality of perforations 72 in the collar 38. After release of the valve 62, the pressurized air forces it to closed position and the spring 70 forces return of the piston cup to the starting position shown in FIG. 2, air being drawn in behind the piston cup through the perforations 72. Air ahead of the piston cup is vented to the atmosphere via the venting flats 62v.

Referring to FIGS. 2, 4 and 5, the mounting boss 26 is suitably recessed to provide a socket in which the shank of the blade 14a fits snugly. The attaching screw bolts 28 pass through the mounting boss for retaining the blade shank and fixedly mounting the blade thereon.

Viewing FIGS. 2 and 5, it will be noted that the control lever 18 has a bifurcated end terminating in a pair of hook-like elements 18h disposed on each side of a narrow boss or projection 74 having a cross pin 76 fixed therein. The elements 18h partially encompass the cross pin 76 which serves as a pivot for the lever 18. The other end of the lever 18 is provided with a slot 18s in which is received a guide post 78 for loosely fitting the lever thereto. The guide post 78 is screwed into the valve unit 16 and disposed about the post is a coil spring 80 pressing against the control lever 18 which is retained on the post by a washer 82 and a screw 84. Fixed to the lever 18 for movement therewith is an actuating post or trigger 86 aligned with the control valve 62. Thus, when the control lever is gripped and moved, the actuating post 86 engages the valve head 62h and unseats the control valve for admitting pressurized air to the piston chamber portion 22. When the grip is loosened on the control lever, the spring 80 operates to move the post 86 from engagement with the valve head, permitting the valve to reseat. With the arrangement described, the cutter 10 may be held in either hand and variably positioned therein, as desired, the cutter operating in a facile and reliable manner in all positions.

Inviting attention also to FIG. 3, it will be noted that the valve housing 58 is engaged by a washer 88 held in place by the guide post 78 for retaining the housing in the bore 56 against the force of the pressurized air.

To prevent inadvertent actuation of the control valve 62 by the post 86, there is provided a safety lever 90 frictionally connected to the unit 16 by a screw 92. During a cutting operation, the safety lever 90 is disposed as shown in FIGS. 2 and 3 but when it is desired to prevent inadvertent operation of the control valve 62, the lever is swung and interposed between the valve and the actuating post 86.

OPERATION

The operation of the hand grip actuated cutting device of the present invention is believed to be clearly apparent and is briefly summarized at this point. With the hand of the operator loosely holding the handle portion 20 between the chamber portion 22 and the boss 74 and with the parts disposed as shown in FIG. 1, the blades 14a and 14b are applied to the work as desired to perform a cutting operation. The hand grip of the operator is then tightened, causing a movement of the control lever toward the handle portion and actuation of the control valve 62 for admission of pressurized air into the chamber portion 22. This causes movement of the piston cup 40 and the connecting rod 34 and compression of the spring 70. Movement of the connecting rod 34 is transmitted through the coupler link 32 to the blade 14b, causing it to move toward blade 14a and perform a cutting operation, after which the grip on the control lever is loosened, the valve reseats and the flow of pressurized air is cut off. The compression built up in the spring 70 forces return of the piston cup and opening of the blades 14a and 14b, air behind the piston cup being vented past the valve head 62h. The cutting device is now ready for another cutting operation.

REMOTE CONTROL FORM

There are many instances where the cutting operation is required to be performed on objects at a distance from the working position of the operator. In such cases, the cutting device of the present invention is modified for remote control thereof. Referring to FIG. 6, there is shown a remotely controlled cutting device 10' which possesses most of the features of the cutting device 10 hereinbefore described and additional features to provide for remote control as will later appear. Accordingly, the device 10' includes a housing and features therein and thereon similar to the device 10 with corresponding numerals.

It is to be noted that the control lever 18 is omitted in the device 10' and that a valve unit 16' of different form is utilized. The valve in the unit 16' is actuated by a post or a trigger 94 fixed to a bell crank 96 pivotally mounted between a pair of mounting bosses 98 formed on the unit 16'. Also connected to the unit 16' is a hollow pole extension 100 of suitable length having a hand grip 102 to which is swively connected a hose 104 delivering pressurized air.

Attached to the pole extension 100 by a pair of straps 106 is a guide tube 108 through which a relatively stiff wire 110 passes. One end of the wire is connected to the bell crank 96 and the other thereof to a bell crank 112 supported on the pole extension by a mounting strap 114. The bell crank 112 is provided with a finger extension 116 adapted to be manipulated by the hand of an operator for imparting movement to the wire 110 for actuation of the control valve in the unit 16'. A spring 118 returns the extension 116 to normal position upon release thereof. A safety lever 90', similar to the safety lever 90 of the device 10 is mounted on the unit 16' and can be interposed in the path of the post 94 to prevent inadvertent actuation of the control valve.

OPERATION OF REMOTE CONTROL FORM

The operation of the remotely controlled cutting device of FIG. 6 is believed to be clearly apparent and is briefly summarized at this point. With the parts disposed, as shown in FIG. 6, and the hands of the operator grasping the pole extension 100 and the hand grip 102, the blades 14a and 14b are positioned relative to the work to be cut. The finger extension 116 of the bell crank 112 is manipulated to exert a pull on the wire 110 and swing the bell crank 96 for actuation of the control valve in the unit 16'. Pressurized air is admitted to the housing 12, causing movement of the piston cup 40 therein for moving the blade 14b relative to the blade 14a and effecting a cutting operation. Release of the finger extension 116 permits closing of the control valve and cut-off of the supply of air, after which the parts are returned to the normal position. To render the cutting device 10' inoperative, the safety lever 90' is interposed between the post 94 and the unit 16'.

There have thus been provided improved cutting devices of relatively inexpensive construction with a minimum number of moving parts operated in a facile and reliable manner and which are easily dissembled and maintained for longer trouble-free service and may be positioned to perform cutting operations on work close at hand or at a distance.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A cutting device comprising an elongated hollow housing having a chamber portion at one end and mounting means at the other end; cutting means supported on said mounting means; movable means in said chamber portion connected to said cutting means adapted to be moved for operating the cutting means to effect a cutting operation; a valve unit connected to said housing in sealed relation thereto and closing said chamber portion, said valve unit including a passageway in communication with said chamber portion and a source of pressurized fluid adapted to direct a flow of such fluid to the chamber portion for moving said movable means and including therein operable means for controlling said flow; and control means associated with said operable means for controlling the flow of fluid and thereby dictating the movement of the movable means, including a pivotally displaceable, elongated control member pivotally connected at one end to said housing adjacent to said mounting means and extending substantially coextensively therewith, said control member including means defining therein a slot arranged at its opposite end and having an actuating post supported thereon in operative alignment with said valve unit adapted to be displaced into engagement with the operable means for effecting an operation thereof as the control member is displaced, and a guide post extended from said valve unit received within said slot for guiding said pivotally displaceable control member.

2. The device of claim 1 further including safety means interposable between said force transmitting means and said valve unit for preventing inadvertent actuation of the latter.

3. The device of claim 1 wherein said chamber portion is integrally joined to said mounting means by a tubular portion constituting a handle, and said elongated control member is disposed closely adjacent to said handle and coextensive therewith, said handle and control member portion being adapted to be encompassed by the hand of an operator of the device.

4. The device of claim 3 wherein said housing is provided with a reinforcing rib disposed between said handle and said mounting means, said rib serving as a guard for the hand of the operator.

References Cited

UNITED STATES PATENTS

| 1,125,521 | 1/1915 | Harrison | 251—111 X |
| 2,133,364 | 10/1938 | Temple. | |
| 3,152,399 | 10/1964 | Knab | 30—295 X |
| 3,165,780 | 1/1965 | Kellersman | 30—249 X |
| 3,373,490 | 3/1968 | Lendaro | 30—249 |

FOREIGN PATENTS 999,352  10/1951  France.

ROBERT C. RIORDON, Primary Examiner

J. C. PETERS, Assistant Examiner

U.S. Cl. X.R.

251—114